United States Patent
Tran et al.

(10) Patent No.: US 8,732,286 B2
(45) Date of Patent: May 20, 2014

(54) HEALTH MANAGEMENT SYSTEMS WITH SHADOW MODULES

(75) Inventors: My Tran, Albuquerque, NM (US); Kathleen Crumpton, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 324 days.

(21) Appl. No.: 12/751,334

(22) Filed: Mar. 31, 2010

(65) Prior Publication Data

US 2011/0246632 A1    Oct. 6, 2011

(51) Int. Cl.
 G06F 15/167 (2006.01)
 G06F 15/173 (2006.01)

(52) U.S. Cl.
 USPC ........... 709/223; 709/201; 709/202; 709/203; 709/212; 709/213; 709/214; 709/215; 709/216; 709/224; 709/225; 709/226

(58) Field of Classification Search
 USPC .................. 709/201–203, 212–216, 223–226
 See application file for complete search history.

(56) References Cited

U.S. PATENT DOCUMENTS

| | | | |
|---|---|---|---|
| 5,778,372 A * | 7/1998 | Cordell et al. ........................ 1/1 |
| 5,996,086 A * | 11/1999 | Delaney et al. ............... 714/4.11 |
| 6,769,022 B1 * | 7/2004 | DeKoning et al. ............ 709/223 |
| 6,943,699 B2 | 9/2005 | Ziarno |
| 7,007,047 B2 * | 2/2006 | Zelenka et al. ........................ 1/1 |
| 7,020,697 B1 * | 3/2006 | Goodman et al. ............. 709/223 |
| 7,233,989 B2 * | 6/2007 | Srivastava et al. ............ 709/224 |
| 7,284,150 B2 * | 10/2007 | Ma et al. ........................ 714/6.23 |
| 7,287,075 B2 * | 10/2007 | Srivastava et al. ............ 709/224 |
| 7,424,514 B2 * | 9/2008 | Noble et al. .................... 709/205 |
| 7,467,198 B2 * | 12/2008 | Goodman et al. ............. 709/223 |
| 7,496,783 B1 * | 2/2009 | Graf et al. ..................... 714/4.11 |
| 2002/0083146 A1 * | 6/2002 | Ferguson et al. ............. 709/213 |
| 2002/0124081 A1 * | 9/2002 | Primm et al. .................. 709/224 |
| 2003/0225880 A1 * | 12/2003 | Srivastava et al. ............ 709/224 |
| 2003/0229804 A1 * | 12/2003 | Srivastava et al. ............ 713/200 |
| 2003/0233446 A1 * | 12/2003 | Earl .............................. 709/224 |
| 2004/0078125 A1 | 4/2004 | Woodard et al. |
| 2004/0153458 A1 * | 8/2004 | Noble et al. ..................... 707/10 |
| 2004/0176887 A1 | 9/2004 | Kent et al. |
| 2006/0075294 A1 * | 4/2006 | Ma et al. ......................... 714/13 |
| 2006/0106577 A1 | 5/2006 | Hatakeyama |
| 2007/0198675 A1 | 8/2007 | Amanuddin et al. |
| 2008/0104147 A1 | 5/2008 | Schwaab et al. |
| 2008/0189413 A1 * | 8/2008 | Srivastava et al. ............ 709/224 |
| 2008/0284575 A1 | 11/2008 | Breed |
| 2009/0228519 A1 * | 9/2009 | Purcell et al. .............. 707/104.1 |

* cited by examiner

Primary Examiner — David Lazaro
Assistant Examiner — Edward Kim
(74) Attorney, Agent, or Firm — Ingrassia Fisher & Lorenz, P.C.

(57) ABSTRACT

A shadowing platforms and systems in a network with a remote platform are provided. The shadowing platform includes a shadow health management module and platform storage coupled to the shadow health management module. The shadow health management module is configured to receive health information from the remote platform; store the health information in the platform storage; receive status information from the remote platform; and provide the health information to the remote platform when the status information is unacceptable.

19 Claims, 11 Drawing Sheets

HEALTH MANAGEMENT SYSTEMS WITH SHADOW MODULES

STATEMENT REGARDING FEDERALLY SPONSORED RESEARCH OR DEVELOPMENT

This invention was made with Government support under Contract Nos. W56HZV-05-C-0724from the US Army. The Government has certain rights in this invention.

FIELD OF THE INVENTION

The present invention relates generally to health management systems, and, more particularly, to systems and methods for shadowing health management systems.

BACKGROUND OF THE INVENTION

Health management systems are utilized today on a number of platforms, such as in vehicles, airplanes, ships, industrial controls, and computational platforms or controllers. The health management systems typically gather data pertaining to operation of the platform in terms of sensors, equipments, sub-systems, and systems, and provide determinations of the current and future health of the platform based on the health data and models of platform health relations and embedded expressions. The platforms may additionally provide this health data to a central control system of the health management system for further processing. Platforms, with computational resource constraints, are often operating remotely from other portions of the health management system, particularly the central control system. The platforms hosting health management systems may, on occasion, malfunction or otherwise lose the supportive health information necessary for operation. However, there is currently no mechanism for replacing the critical data in these situations.

Accordingly, it is desirable to provide improved health management systems with improvement management of remote platforms associated, for example, as vehicles, aircraft, and the like. Furthermore, the desirable features and characteristics of the present invention will be apparent from the subsequent detailed description and the appended claims, taken in conjunction with the accompanying drawings and the foregoing technical field and background.

BRIEF SUMMARY

In accordance with an exemplary embodiment, a shadowing platform in a network with a remote platform is provided. The shadowing platform includes a shadow health management module and platform storage coupled to the shadow health management module. The shadow health management module is configured to receive health information from the remote platform; store the health information in the platform storage; receive status information from the remote platform; and provide the health information to the remote platform when the status information is unacceptable.

In accordance with another exemplary embodiment, a method is provided for health monitoring in a network of platforms, the method comprising the steps of: receiving, at a resident platform, health information from a first remote platform; storing, in the resident platform, the health information from the first remote platform; receiving, at the resident platform, status information from the first remote platform; and providing, from the resident platform, the health information of the first remote platform to the first remote platform when the status information is unacceptable.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Broadly, exemplary embodiments discussed herein include a health management network of platforms having shadow health management. The shadow health management modules may receive critical data from remote platforms, determine the status of the remote platforms, and restore critical data of the remote platforms, as necessary.

Figure 1:
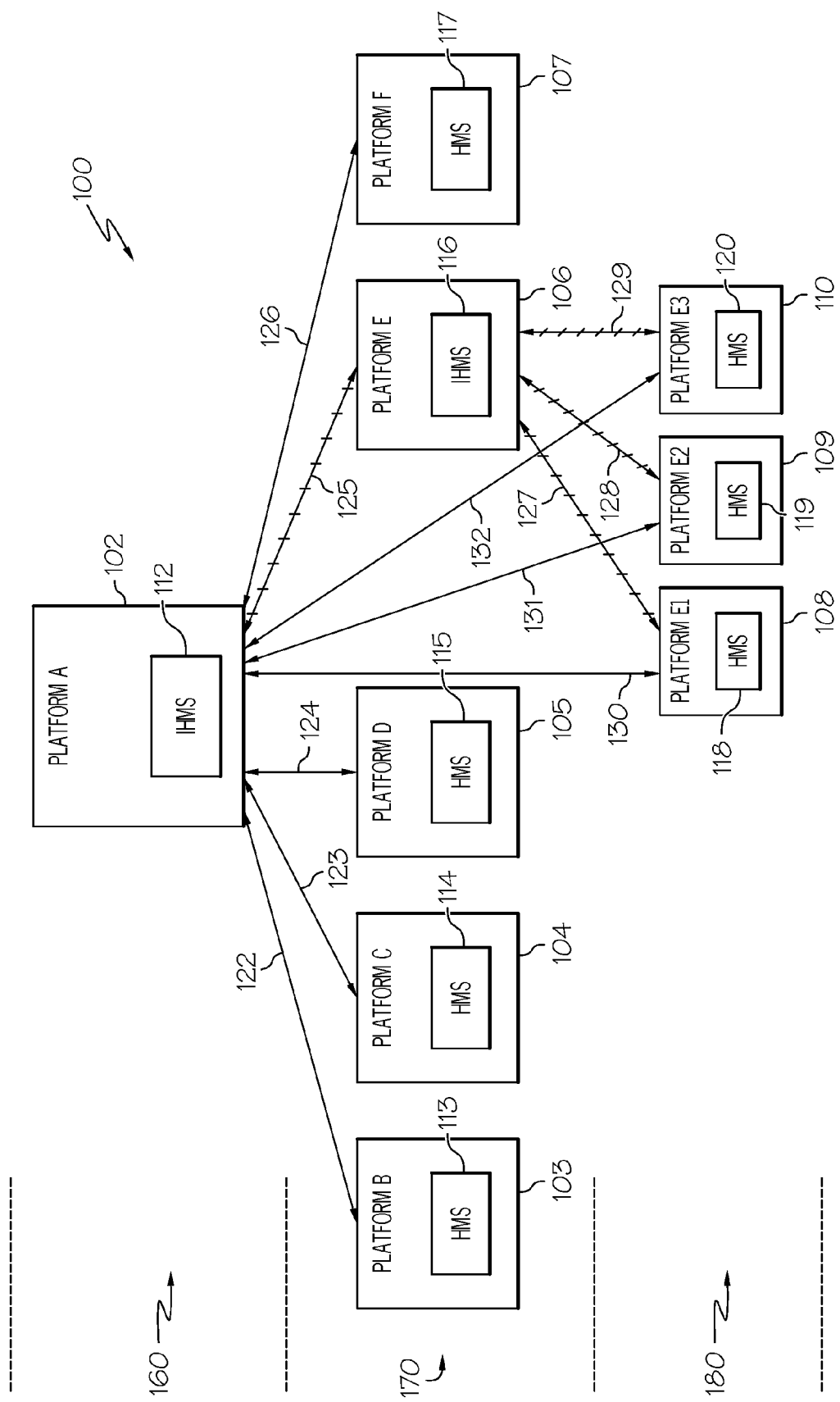
FIG. 1 is an architectural block diagram of an integrated health management network for monitoring and shadowing the health of various platforms in accordance with an exemplary embodiment.

FIG. 1 is an architectural block diagram of a health management network 100 for monitoring and shadowing the health of various platforms 102-110 in accordance with an exemplary embodiment. In the depicted embodiment, nine platforms 102-110 are depicted, namely, platform A (102), platform B (103), platform C (104), platform D (105), platform E (106), platform F (107), platform E1 (108), platform E2 (109), and platform E3 (110). Each of the platforms 102-110 may include a health management system (HMS) 113-115, 117-120 (e.g., HMS 113 in platform B (103)) or an integrated health management system (IHMS) 112, 116 (e.g., IHMS 112 in platform A (102)). The platforms 102-110 are coupled to one another via communications data links 122-132. The HMSs 113-115, 117-120, IHMSs 112, 116, and communications data links 122-132 will be discussed in greater detail below. The HMSs 113-115, 117-120 generally manage the health of the subject platform 103-105, 107-110 (i.e., HMS 113 manages the health of platform B (103)), while IHMSs 112 and 116 manage the health of the subject platform 102, 106 and remote platforms 103-110 with respect to the respective subject platform 102, 106. In other words, IHMS 112 of platform A (102) may monitor the health of platform A (102) as well as any of the other platforms 103-110.

In general, the platforms 102-110 may be associated with any type of individual or groups of vehicles, systems, or components. For example, the platforms 102-110 may be embedded or otherwise associated with a subject component, such as a sensor, sub-system, system, vehicle, aircraft, ship, industrial component, or the like. One or more platforms 102-110 may also be designated as a controller associated with controlling other platforms. The platforms 102-110 may be associated with different subject components, depending on the embodiment. For example, in one exemplary embodiment, each platform 102-110 is associated with a land vehicle, airplane, marine vehicle, or combination thereof. In another exemplary embodiment, some platforms 102-110 are associated with a land vehicle, and one platform is a controller, such as a command and control center, computer, and/or system, for example for a military operation on a battlefield. In various other embodiments, any number of platforms may be utilized in the network 100, representing any number of the same or different types of vehicles, computers, control centers, and/or other types of apparatus and/or systems.

The network 100 is configured such that one or more of the IHMSs 112, 116 may shadow the HMSs 113-115, 117-120 or another IHMS 112, 116. As discussed in greater detail below, shadowing enables platforms with IHMS to monitor the health of other platforms. As used herein, the term "resident platform" refers to the platform on which the IHMS resides, as opposed to a "remote platform." For example, platform A (102) is a resident platform for IHMS 112, while platform E (106) is a remote platform relative to IHMS 112. Additionally, as used herein, the term "shadowing" refers to platform that is monitoring another platform, and "shadowed" or "shadowee" refers to a platform that is being monitored. At times, a respective platform may be a shadowed platform, a shadowing platform, or both. The shadow functionality provides redundancy, including the ability to reconfigure or replace the data in the shadowed health management system in the event of failure or replacement.

In FIG. 1, the platforms 102-110 are arranged in a schematic representation of an exemplary shadowing hierarchy. As shown, platform A (102) is in a first or top level 160 of the hierarchy and shadows each of platforms in a second level 170 (i.e., platforms B-F (103-107)) via communication links 122-126. Additionally, platform E (106) shadows platforms in a third level 180 (i.e., platforms E1-E3 (108-110)). In general, however, the platforms 102-110 may be arranged in any hierarchy and the exemplary hierarchy of FIG. 1 is provided to provide clarity in the description below.

As such, platform A (102) shadows platform E (106) via communication link 125, which in turn, shadows platforms E1-E3 (108-110) via communication links 127-129. As discussed below, if platform E (106) fails, platform A (102) may establish communication links 130-132 to the platforms 118-120 being shadowed by platform E (106), and the links 125, 127-129 may be terminated.

Figure 2:
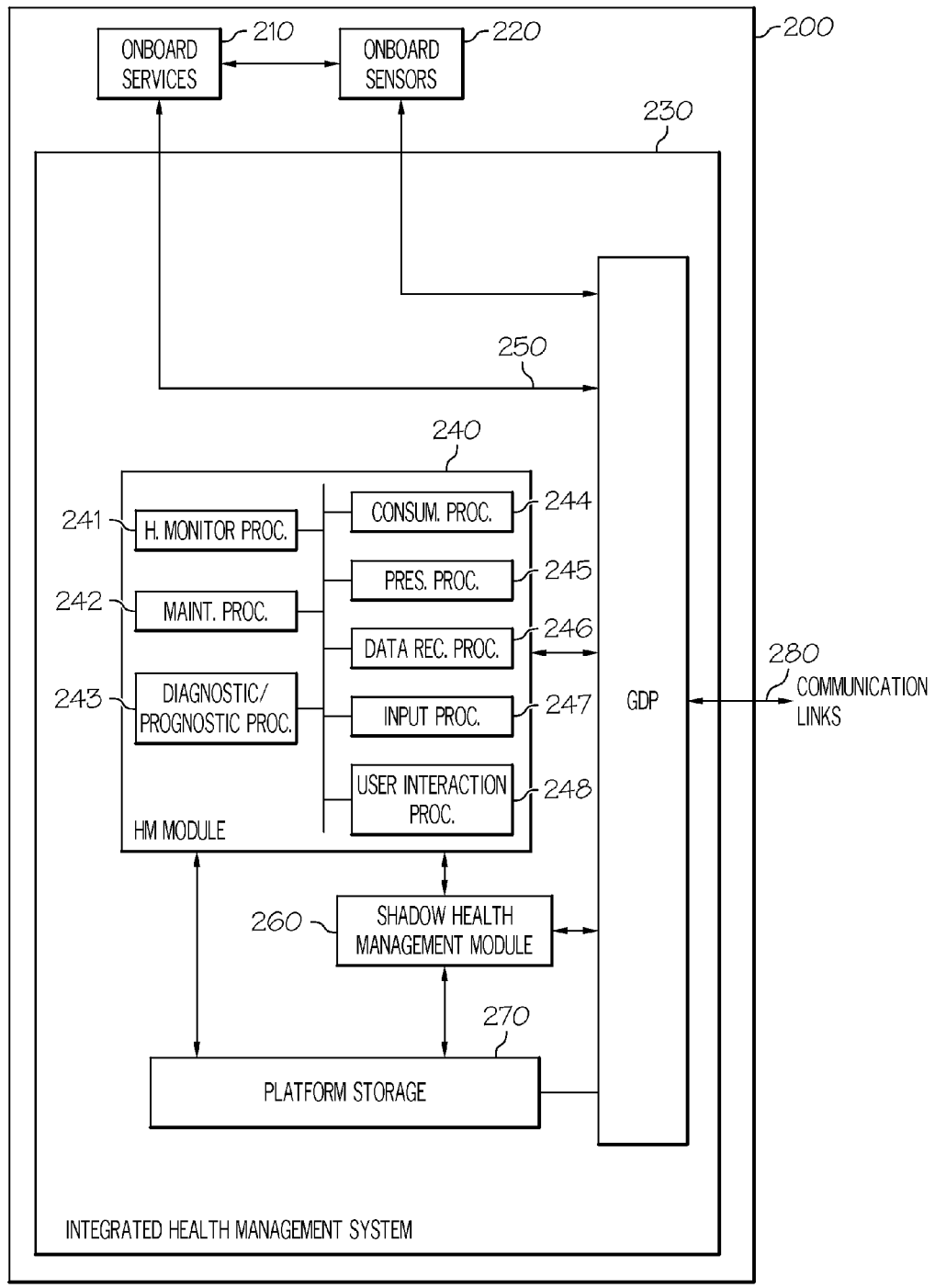
FIG. 2 is a functional block diagram of an integrated health management system of the network of FIG. 1 in accordance with an exemplary embodiment.

FIG. 2 is a functional block diagram of a platform 200, such as the platforms 102-110 of the network 100 of FIG. 1, in accordance with an exemplary embodiment. In the depicted exemplary embodiment, the platform 200 includes onboard services 210 that serve as conduits to provide raw health data of resident and remote platforms, onboard sensors 220, and an integrated health management system (IHMS) 230. As discussed in greater detail below, the IHMS 230 includes a health management module (HMM) 240, a gateway data proxy (GDP) 250, a shadow health management module (SHMM) 260, and platform storage 270.

In general, the onboard services 210 correspond to systems associated with the primary functions of the platform 200 that include one or more systems, computers, and/or devices that interact and/or utilize information of the IHMS 230 pertaining to the operation and/or health of the platform 200 and/or components thereof. The onboard services 210 may include, by way of example only, some or all of the following: vehicle management system, flight control system, environmental monitoring system, engine monitoring system, fuel monitoring system, display system, loading system, emission control system, navigation system, vibration monitoring system, communications system, and/or any number of other different types of systems for the platform 200. The onboard services 210 may further include one or more service families that request or utilize data or information pertaining to the operation and/or health of the platform 200. The service families may include, by way of example only, some or all of the following: platform control services, environmental monitoring services, engine monitoring services, fuel monitoring services, network management services, communications services, situation awareness services, sensor management services, planning management services, vehicle control management services, data link management services, control and display services, and/or any number of other different types of services.

The onboard sensors 220 may also have any number of different onboard sensors. The onboard sensors 220 preferably include one or more sensors and/or devices that measure information and/or data that are utilized by or for the onboard services 210 and IHMS 230. For example, the onboard sensors 220 may include, by way of example only, some or all of the following: surface control sensor, engine temperature monitoring sensor, fuel rate monitoring sensor, chemical detection sensor, motion sensor, emission control sensor, radar detection sensors, vibration monitoring sensors, fluid level sensors, and/or any number of other different types of sensors for the platform 200.

In general, the IHMS 230 provides health management, monitoring equipment health indicating data, tracking equipment and platform service history, maintenance, tracking equipment usage, diagnostics, and prognostics for the platform 200 and any other shadowed platforms. In general, the HMM 240 includes the functional processing units 241-248 that correspond to the functional capabilities for diagnostic, prognostic, and maintenance reasoning for onboard and off-board equipment and/or readiness processing of data and information pertaining to or used by the onboard services 210 of the platform 200 and/or services for remote platforms via the GDP 250. For example, in one exemplary embodiment, the functional processing units 241-248 include a health information monitoring processing unit 241 used to establish platform configuration, receive health monitor data, and provide necessary filtering between desired and undesired data; a maintenance processing unit 242 used to provide maintenance actions and procedures for repairing equipment as well as maintenance statuses; a diagnostic and prognostic reasoning processing unit 243 used to perform fault detection and fault isolation as well as to predict near term health status for equipment; a consumption processing unit 244 used to track current consumption items in terms of remaining quantity, and rate, and provide predictive consumption trending; a presentation processing unit 245 used to generate display data and handle user interactions; a data recording processing unit 246; an input conditioning processing unit 247 used to check the data integrity and filter out any undesired data; and a user interaction monitoring processing unit 248. The processing units 241-248 are merely exemplary and one or more of the processing units 241-248 may be omitted and/or additional units provided. Moreover, additional processors, memory, and/or user interfaces may be provided.

The GDP 250 is embedded within or coupled to the IHMS 230. The GDP 250 facilitates the communication link and data transfer between the IHMS 230 of platform 200, and with corresponding GDPs on the other platforms, and facilitates the functions of the IHMSs and HMSs for the overall network 100 (see, e.g., FIG. 1). For example, in one exemplary embodiment, the GDP 250 collects data, information, and requests for the IHMS 230 from the onboard services 210 and the onboard sensors 220 of the platform 200, in addition to data, information, and requests from similar components of other remote platforms among other possible platforms within the network 100 (see FIG. 1). The GDP 250 then distributes the collected data to local services and/or routes it to remote GDPs.

In addition, the GDP 250 also facilitates the functions of the IHMSs and HMSs of other platforms. For example, in one exemplary embodiment, the GDP 250 collects and provides health and consumption data, platform related information, platform configuration, maintenance record, repair record, equipment usage record, platform history data, computation of availability and readiness results, interaction commands, and requests for and to the other platforms of the network 100.

The onboard services 210 and the onboard sensors 220 are coupled to the IHMS 230 through the GDP 250 with any suitable connection that facilitates the bi-directional data transfer among them. Similarly, the HMM 240, GDP 250, SHMM 260, and platform storage 270 are also coupled together with any suitable connection that facilitates the bi-directional data transfer among them. Such connections may comprise a communications bus or a network communication protocol, a wireless network, any one or more of a number of different types of connections such as client and server, point to point communication, and other methods of communication. As noted above, the platform 200 is coupled to other platforms via one or more communication links 280, which may comprise one or more different types of wireless networks. The modules and/or units discussed herein may include one or more processors, including any type of processor, integrated circuit, or microprocessor. The processors may include any suitable number of integrated circuit devices and/or circuit boards working in cooperation to accomplish the functions of a processing unit. During operation, such processors execute the programs within platform storage 270 or within suitable memory associated with module or unit itself, as such, control the general operation of the IHMS 230.

The platform storage 270 may include any suitable memory or storage components. For example, platform storage 270 can include the various types of dynamic random access memory (DRAM) such as SDRAM, the various types of static RAM (SRAM), and the various types of non-volatile memory (PROM, EPROM, and flash). It should be understood that platform storage 270 may be a single type of memory component, or it may be composed of many different types of memory components. Platform storage 270 can include any suitable type of storage apparatus, including direct access storage devices such as hard disk drives, floppy disk drives and optical disk drives.

Figure 3:
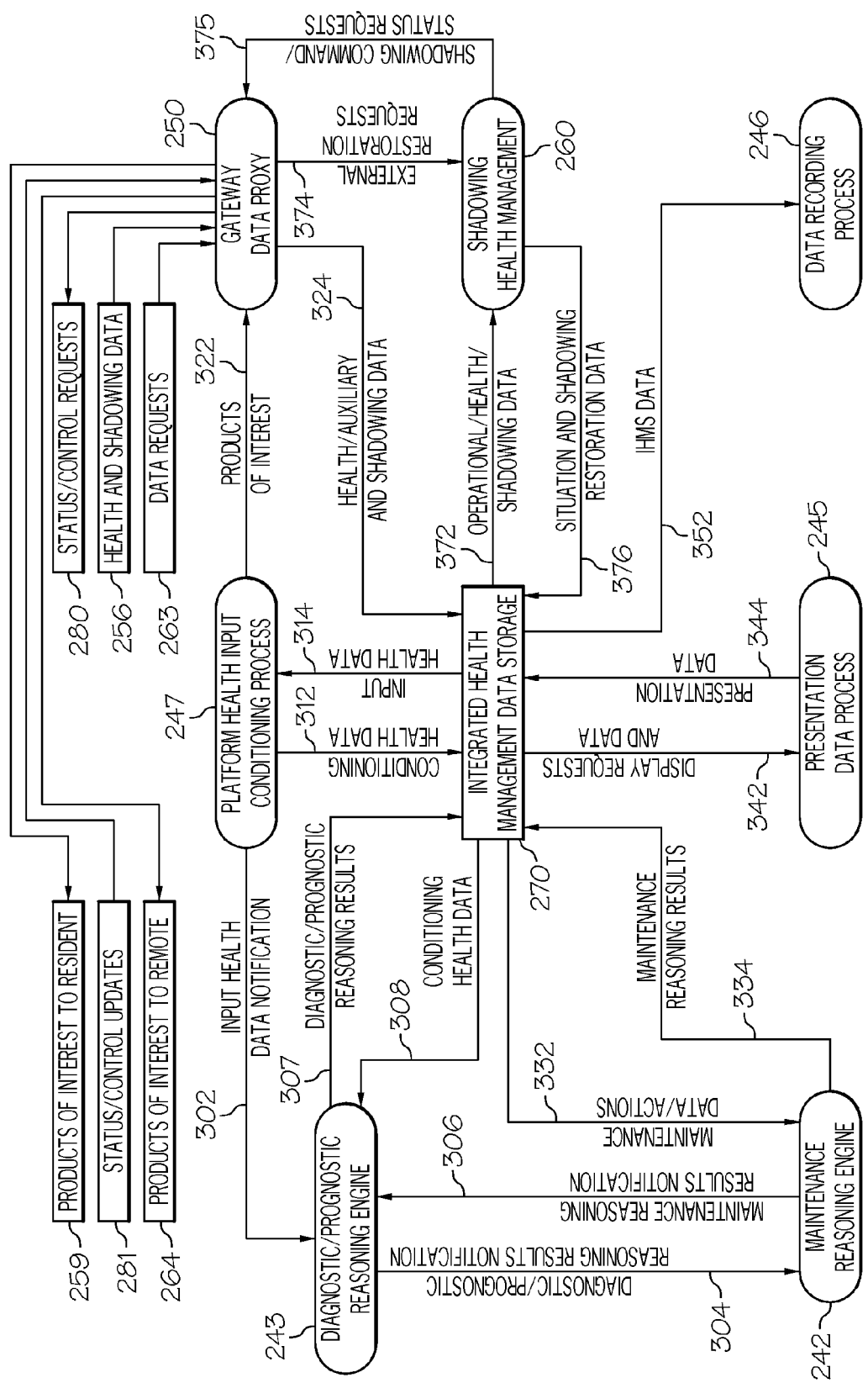
FIG. 3 is a diagram depicting data flows within the integrated health management system of FIG. 2 in accordance with an exemplary embodiment.

FIG. 3 is a diagram depicting data flows within the integrated health management system (IHMS) 230 of FIG. 2 in accordance with an exemplary embodiment. In FIG. 3, the depicted data flows include interactions between selected components of the platform 200, including maintenance processing unit 242 of the HMM 240, diagnostic/prognostic processing unit 244 of the HMM 240, presentation processing unit 245 of the HMM 240, the data recording processing unit 246, input conditioning processing unit 247, the GDP 250, the SHMM 260, and the platform storage 270, although other interactions may be provided.

In one exemplary embodiment, the GDP 250 receives health and shadowing data, as indicated by data flow 256, from the resident platform 200 as well as any remote platforms that the IHMS 230 is shadowing. In general, health data may include any historical, operational, or configuration data necessary or desired for health diagnostics, prognostics, maintenance, presentation, or recording. This data may further include platform identifications, status, notifications, requests, and commands. The health data is generally associated with the resident platform while shadowing data is health data associated with a remote platform that the IHMS 230 of the resident platform is shadowing. As discussed in greater detail below, this shadowing data generally includes critical health data necessary or desired for evaluation or reconstruction of the health management system of the shadowed platform.

The GDP 250 may place the health and shadowing data, as indicated by data flow 324, in platform storage 270. Additionally, the GDP 250 may receive data requests from the services and systems of remote and resident platforms, as indicated by data flow 263. These interactions may be initiated by requests or receipts of health statuses, maintenance status and records, and platform readiness. In response, the GDP 250 may retrieve this information from platform storage 270 and provide the products of interest corresponding to the request to the resident and remote platforms, as indicated by data flows 259, 264. The products of interest may include operational, health, usage data, environmental data, mode status information, maintenance orders and records, supply data, equipment and platform readiness, diagnostics and/or prognostics results pertaining to the operation and/or health of the respective platform.

Input health data 314 is then provided to the input conditioning processing unit 247. In one exemplary embodiment, the input health data 314 corresponds to at least part of the heath data 324 provided by the GDP 250, and includes data pertaining to the health and/or operation of the platform on which the GDP 250 resides, as well as relevant data pertaining to other platforms with which the GDP 250 has shared information.

The input health data 314 is then filtered, conditioned, and transformed by the input conditioning processing unit 247 and returned to the platform storage 270 as conditioned health data 312. In addition, an input health data notification or trigger 302 is provided to diagnostic and prognostic processing unit 243.

The diagnostic and prognostic processing unit 243 of the IHMS 230 obtains stored conditioning health data 308 from the platform storage 270 after receiving the notification 302 from the input conditioning processing unit 247. The diagnostic and prognostic processing unit 243 processes the stored conditioning health data 308 and generates diagnostic and prognostic reasoning results 307. The diagnostic and prognostic reasoning results 307 are provided to the platform storage 270, and a notification 304 pertaining thereto is provided to the maintenance processing unit 242 to initiate the maintenance activity process by the diagnostic and prognostic processing unit 243.

Upon receiving the notification 304 from diagnostic and prognostic processing unit 243, the maintenance processing unit 242 obtains maintenance requirement data and maintenance task lists 332 from platform storage 270 based on the diagnostic and prognostic reasoning results 307. The maintenance processing unit 242 processes this data and information in order to generate maintenance reasoning results 334. The maintenance reasoning results 334 are provided to the platform storage 270 and a notification 306 corresponding to the results of maintenance activities is provided to the diagnostic and prognostic processing unit 243 for further processing and for use in updating the diagnostic and prognostic reasoning results 307.

The presentation processing unit 245 receives display requests and data 342 from the platform storage 270. The display requests 342 pertain to one or more requests for displays of information pertaining to the diagnostic and prognostic reasoning results 307 and/or the maintenance reasoning results 334. The display request 342 may be made, by way of example only, from one or more platforms, computer systems, operators, control centers, users, and/or other individuals, devices, and/or systems, by way of further example.

The presentation processing unit 245 then prepares presentation data 344 based on the display requests and data 342. The presentation data 344 may include, by way of example only, diagnostic and prognostic results, maintenance records and recommendations, operational data and characteristics of the corresponding platform and/or one or more other platforms, and/or various other types of presentation data 344. The presentation data 344 may be displayed on one or more audio and/or visual displays. In addition, the presentation data 344 may be stored in the platform storage 270 (to allow the GDP 250 to distribute the presentation data 344 to a display service family of the platform through resident products of interest 259) and sent to data recording processing unit 246 as IHMS data 252 to be recorded along with other data extraction from platform storage 270 for subsequent use for operational playback and performance accuracy analysis of the IHMS.

The SHMM 260 provides shadowing control and status requests 375 through the GDP 250 as data flow 280 to initiate shadowing of remote platforms by the resident platform 200 and to check on the status of the platforms that the SHMM 260 is currently shadowing. These requests 375 may result in the control and status updates 281 and/or the health and shadowing data 256, as discussed above. The SHMM 260 receives operational and health shadowing data 372 from platform storage 270, the management of which is discussed in greater detail below. The control and status updates 381 may include readiness information associated with the remote platforms. Upon receiving an external restoration request, or based upon an unacceptable status update, the SHMM 260 may also provide situation and shadowing restoration data 376 to the platform storage 270, which in turn is distributed to the appropriate remote platform as a product of interest 264 via the GDP 250.

Figure 4:
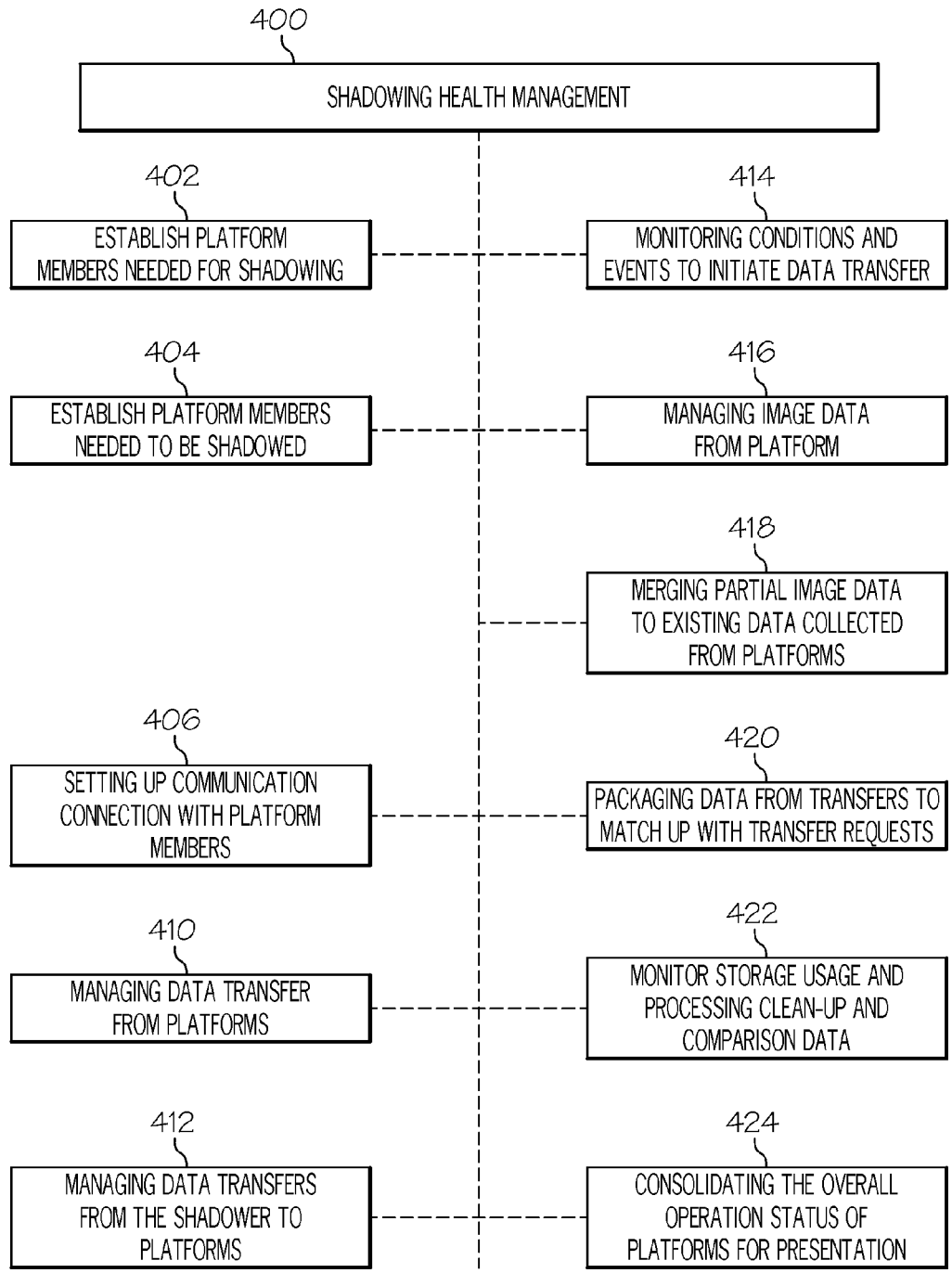
FIG. 4 is a block diagram depicting a composite structure of a shadow health management module of the integrated health management system of FIG. 2 in accordance with an exemplary embodiment.

FIG. 4 is a block diagram depicting a composite shadow health management structure 400 of a shadow health management module (SHMM). In one exemplary embodiment, the composite management structure 400 is used to show the structural components of the SHMM 260 of FIG. 2. In general, the SHMM 260 manages the data flow discussed above in FIG. 3, including the shadowing control and monitoring, collection and management of shadowing data, and providing restoration data, as discussed in greater detail below. As shown in FIG. 4, the SHMM 260 may contain a number of functional sub-modules, including establishing platforms needed for shadowing (block 402) and establishing platform members needed to be shadowed (block 404). The shadowing responsibility list may be established based on operational and deployment policies with the allowance of user selection and modification. In other embodiments, the shadowing responsibility list may be established by algorithm that takes geodetic proximity into consideration and weighs processing resources with shadowing needs. The SHMM 260 sets up communication links with platform members (block 406) based on the shadowing responsibilities assigned in block 402 and block 404. The SHMM 260 also manages data transfer from the platforms being shadowed to the shadowing platforms (block 410) and manages data transfer from the shadowing platforms to the platforms being shadowed (block 412) to facilitate the initial setup in assuming responsibilities of managing health for a target platform or to the construction of key elements needed such as established platform configuration and fault relationship data constructs of a selected platform.

In addition, the SHMM 260 monitors conditions and events to initiate an image data transfer (block 414) based on periodic summary messages and event notifications from the shadowing platforms. The provided data allows the SHMM to determine if configuration data, maintenance record data, and/or constructs of relational fault data have been changed in a shadowed platform. If any indicative condition is true, the SHMM 260 initiates specific data requests and manages image data transfer (block 416) between shadowed and shadowing platforms in terms of validating receive data and providing feedback. To minimize the process time required to populate a complete data image from each shadowed platform for each update, the SHMM 260 may merge partial image data that has changed to the existing data collected (block 418) and packages the maintained data to send to the shadowed or shadowing platforms in response to a transfer request (block 420). This request can be in the form of the latest configuration file, latest maintenance records, relational fault constructs, or a complete reconstruction of health management infra-structure. To prevent the computational resource saturation, the SHMM 260 may periodically monitor the usage of storage, perform clean-up of outdated data, and compartmentalize data to facilitate the need of data retrieval request from shadowed platforms (block 422). Another function of the SHMM 260 is to aggregate the operational statuses from all shadowed platforms in terms of network connectivity, operational readiness, and logical relationship in shadowing hierarchy, and to provide this presentation data to a display service (block 424). Further details of a number of these functions are discussed below in reference to FIGS. 6-10.

Figure 5:
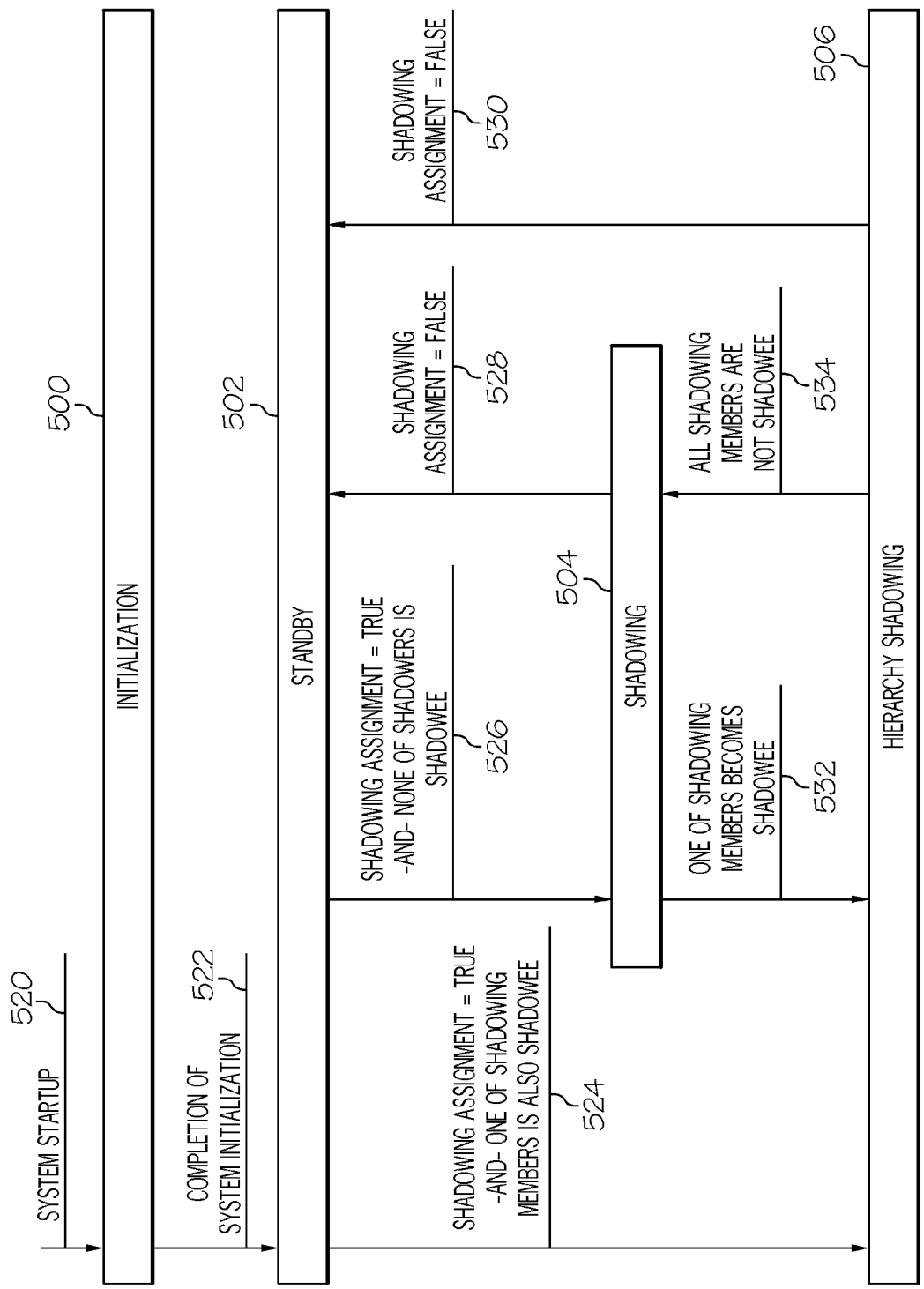
FIG. 5 is a flowchart depicting the states of the shadow health management module of FIG. 4.

FIG. 5 is a flowchart depicting the states of the shadow health management module (SHMM) 260 of FIG. 2. As depicted in FIG. 5, the SHMM 260 may have four general states, including initialization 500, stand-by 502, shadowing 504, and hierarchy shadowing 506. Initially, the SHMM 260 receives a start-up message 520 that places the system in the initialization state 500. Upon completion of system initialization 522, the SHMM 260 transitions into the stand-by state 502. The next transition of the SHMM 260 depends on the shadowing assignment of the SHMM 260. If the SHMM 260 has a shadowing assignment and is not itself a shadowee (scenario 526), the SHMM 260 transitions into the shadowing state 504. However, if the SHMM 260 has a shadowing assignment and is itself a shadowee (scenario 524), the SHMM 260 transitions from the stand-by state 502 into the hierarchy shadowing state 506.

In the shadowing state 504, the SHMM 260 transitions back into the stand-by state 502 if the shadowing assignment is removed (scenario 528). If the SHMM 260 is itself designated a shadowee (scenario 532), the SHMM 260 transitions from the shadowing state 504 into the hierarchy shadowing state 506.

In the hierarchy shadowing state 506, the SHMM 260 transitions back to the shadowing state 504 if the SHMM 260 is removed from being a shadowee (scenario 534). Additionally, if the SHMM 260 is removed from shadowing (scenario 530), the SHMM 260 transitions from the hierarchy shadowing state 506 to the stand-by state 502.

Figure 6:
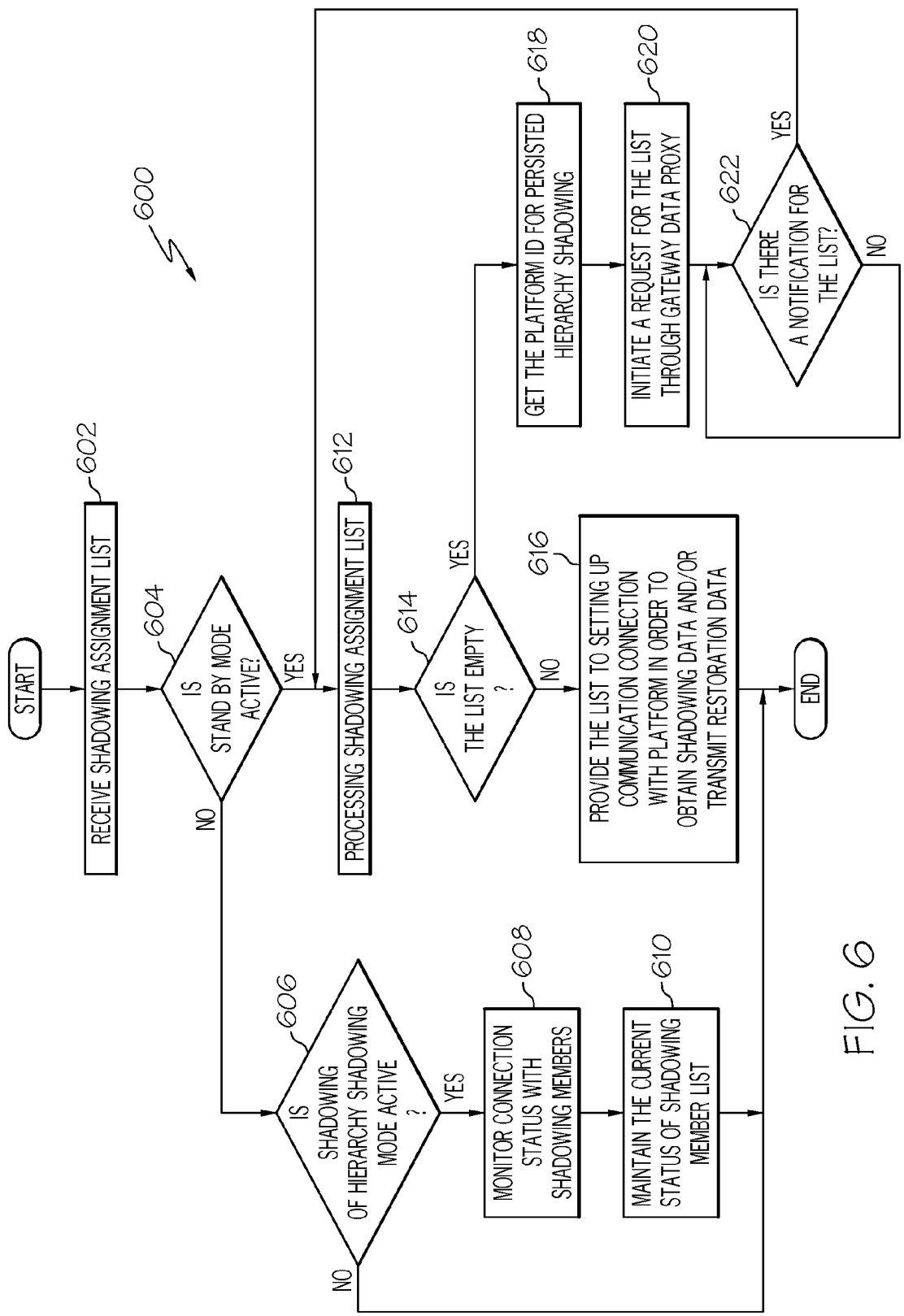
FIG. 6 is a flowchart depicting a process for health data management used in connection with the shadow health management module of FIG. 4, namely the process of establishing shadowing responsibilities, in accordance with an exemplary embodiment.

FIG. 6 is a flowchart depicting a process 600 for health data management used in connection with the SHMM 260 of FIG. 2, namely the process 600 of establishing shadowing responsibilities, in accordance with an exemplary embodiment. In general, the process 600 may correspond to establishing platform members needed for shadowing and to be shadowed (blocks 402 and 404 of FIG. 4).

In a first step 602, the SHMM 260 receives the list of shadow assignments. In a second step 604, if the SHMM 260 is not in the stand-by mode, the process 600 proceeds to step 606 to determine if the SHMM 260 is in the shadowing or hierarchy shadowing mode. If the SHMM 260 is not in the shadowing or hierarchy shadowing mode, the process 600 is terminated. However, if the SHMM 260 is in the shadowing or hierarchy shadowing mode in step 606, the SHMM 260 monitors the current connections with shadowing members in step 608 and maintains the currently valid status of the shadowing assignment list in step 610.

Returning to step 604, if the SHMM 260 is in stand-by mode, the SHMM proceeds to step 612 and processes the shadowing assignment list. In step 614, the SHMM 260 evaluates whether or not the list is empty. If the list is not empty, the SHMM 260 sets up communication links with the assigned platforms to obtain shadow data and/or transmit restoration data 616, and this process is terminated. Returning to step 614, if the list is empty, the SHMM 260 determines the identification for the platform that provided the list in step 618 and initiates a request for the list in step 620. In step 622, the SHMM 260 waits for notification of receipt of the replacement list, and upon such notification, returns to step 612.

Figure 7:
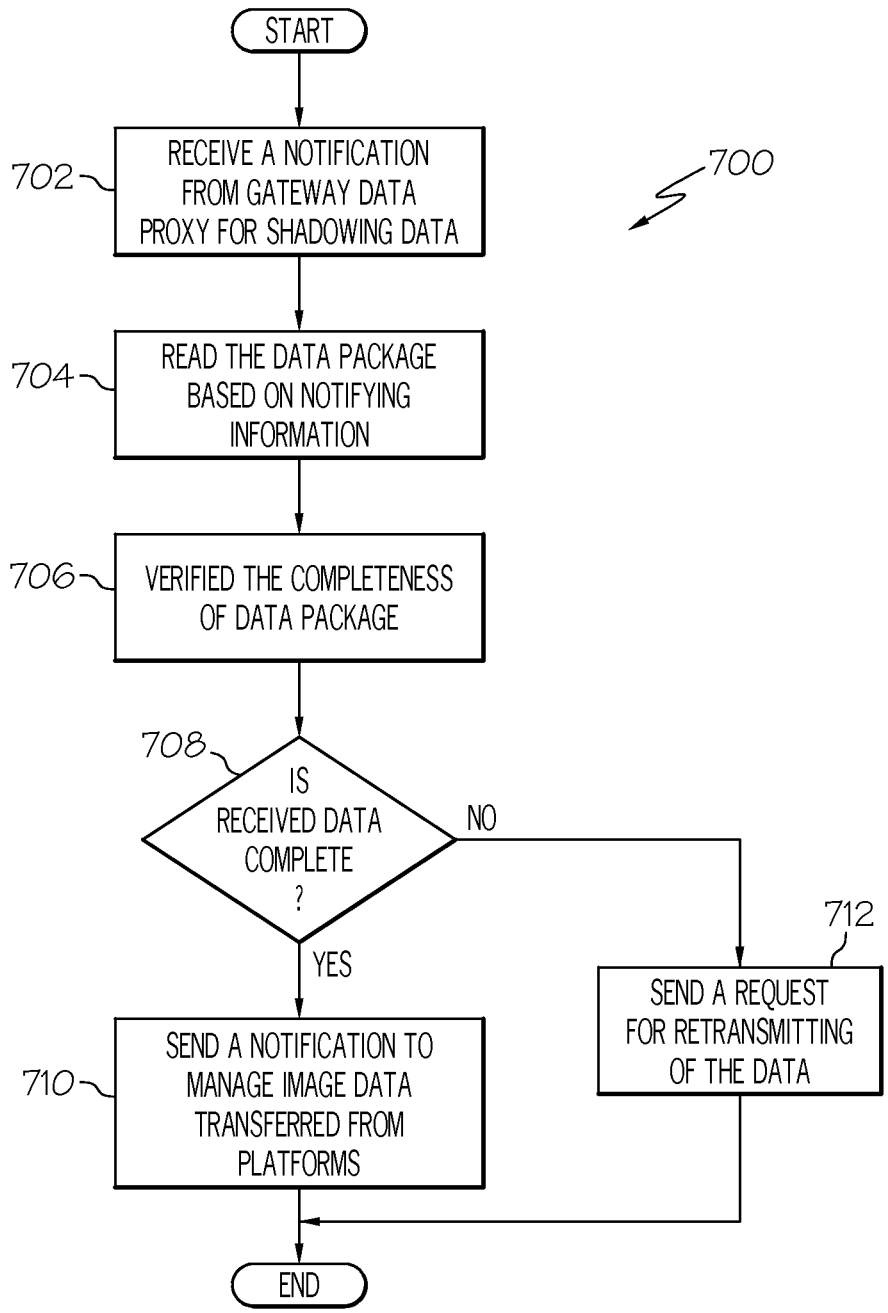
FIG. 7 is a flowchart depicting a process for health data management used in connection with the shadow health management module of FIG. 4, namely the process of managing data transfers, in accordance with an exemplary embodiment.

FIG. 7 is a flowchart depicting a process 700 for health data management used in connection with the SHMM of FIG. 2, namely the process of managing data transfers, in accordance with an exemplary embodiment. In general, the process 700 may correspond to managing data transfer from the shadowed platforms to the shadowing platforms (block 410).

In a first step 702, the SHMM 260 receives a notification from the GDP 250 associated with shadow data from the shadowed platform. In a second step 704, the SHMM 260 reads the shadow data, and in a third step 706, the SHMM 260 evaluates the completeness of the shadow data using an embedded checksum or CRC. If the shadow data from the shadowed platform is complete in a step 708, the SHMM 260 sends a notification to initiate the management of the image data transfer from the shadowed platform in a step 710. The management of the image data generally corresponds to block 416 of the composite structure and is discussed in greater detail below. Returning to step 708, if the shadow data is not complete, the SHMM 260 sends a request to the shadowed platform to resend the data, as noted in step 712, to ensure the integrity of data being received.

Figure 8A:
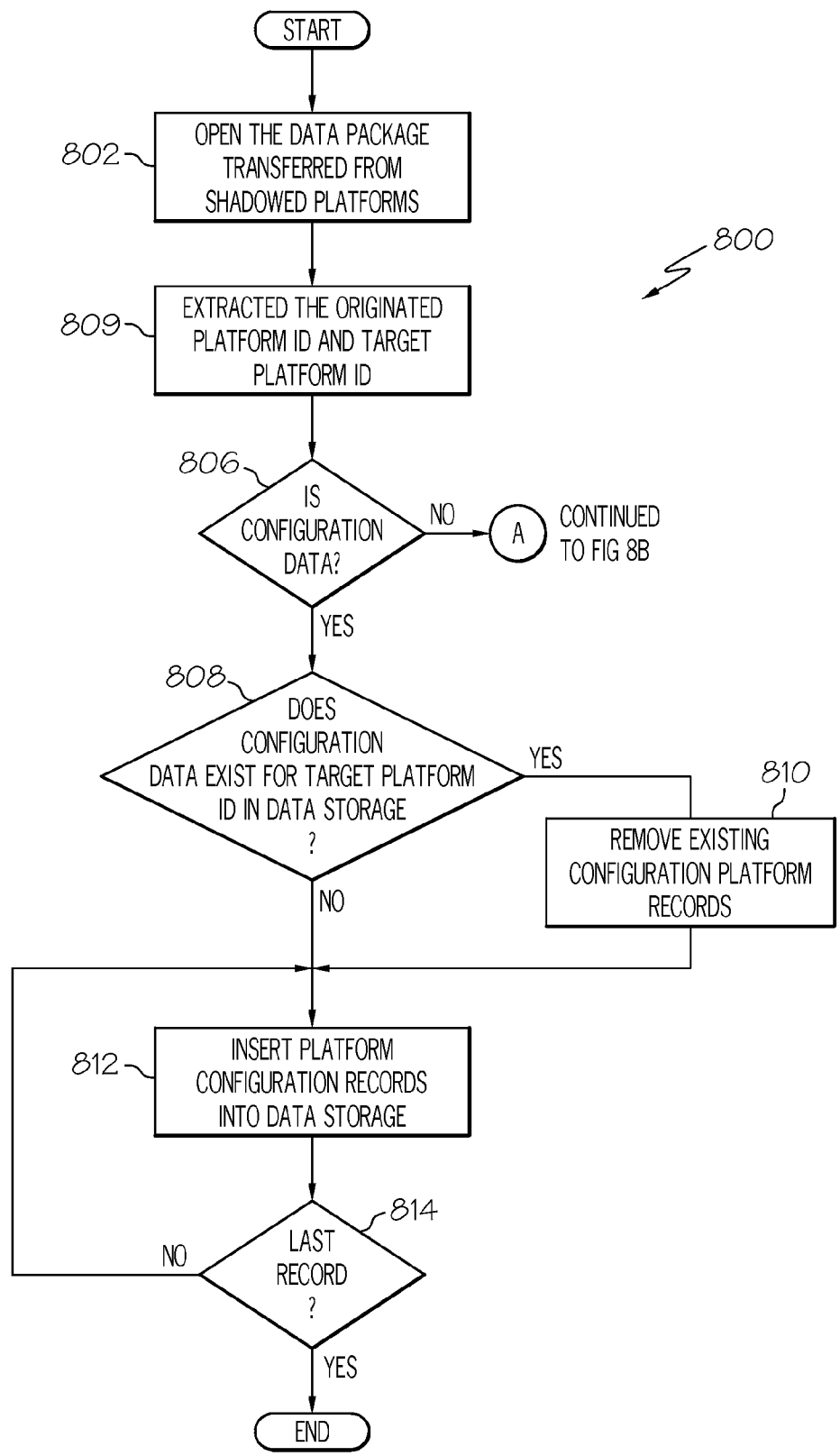
FIGS. 8A and 8B comprise a flowchart depicting a process for health data management used in connection with the shadow health management module of FIG. 4, namely the process of managing image data transfers, in accordance with an exemplary embodiment.
Figure 8B:
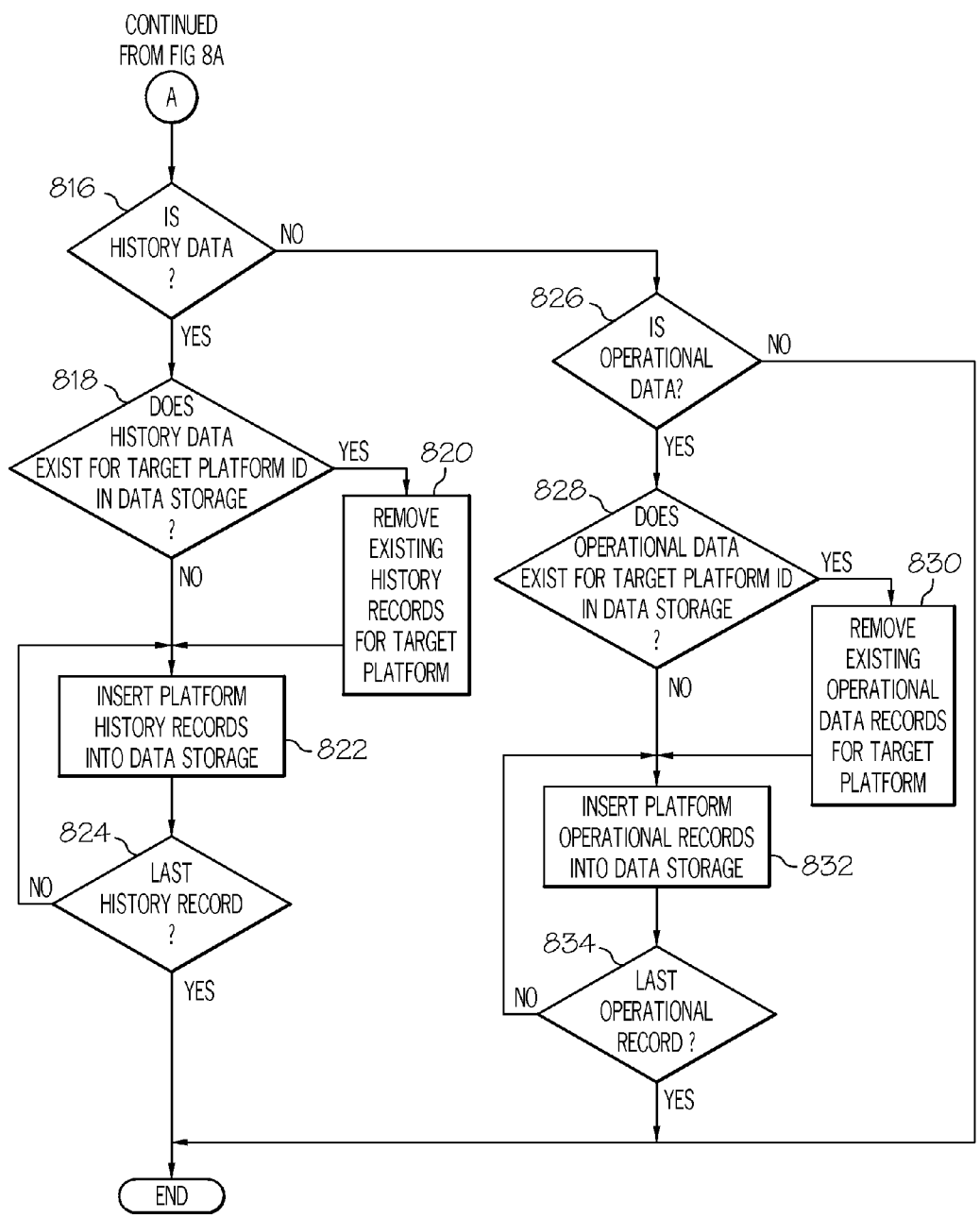

FIGS. 8A and 8B comprise a flowchart depicting a process 800 for handling health and maintenance related data and operational data used in connection with the shadow health management module of FIG. 2, namely the process of managing image data transfers, in accordance with an exemplary embodiment. In general, the process 800 may correspond to managing image data transfer from shadowed platforms (block 416 of FIG. 4).

In a first step 802, the SHMM 260 processes the image data package sent from the shadowed platforms. The image data package typically includes identification (ID) of the platform relaying the data, the ID of the platform originating the data, and one or more of types of image data. The image data may include configuration data that is used to establish specific equipment installed on a platform, history data containing a comprehensive record of maintenance history for each piece of equipment, and operational data concerning the current state of the shadowed platforms as well as the aggregated information of the next assigned shadowing level. In step 804, the SHMM 260 extracts the originating platform ID and the target platform ID to be used as pointer for data storage. In step 806, the SHMM 260 determines if the image data package includes configuration data. If the image data package does not include configuration data, the SHMM 260 proceeds to the steps in FIG. 8B, discussed below. In step 806, if the SHMM 260 includes configuration data, the SHMM 260 determines if configuration data exists for shadowed platform in data storage, as indicated by step 808. This can be determined, for example, by the platform IDs from step 802. If the configuration data already exists, the SHMM 260 removes the existing configuration data in step 810 and proceeds to insert the new configuration data into data storage in step 812. If the configuration data does not already exist in step 808, the SHMM 260 proceeds directly to step 812 and inserts the configuration data into data storage. If the configuration data is the last configuration data record in step 814, the SHMM 260 terminates the process 800. If not, the SHMM 260 continues to insert configuration data into data storage, as indicated by step 812.

Referring to FIG. 8B, which results from the image data package for not having configuration data in step 806 of FIG. 8A, the SHMM 260 determines if the image data package includes history data in step 816. If the image data package does not include history data, the SHMM 260 proceeds to the step 826, discussed below. In step 816, if the SHMM 260 includes history data, the SHMM 260 determines if history data exists for shadowed platform in data storage, as indicated by step 818. This can be determined, for example, by the data types from step 802 and platform IDs from step 804. If the history data already exists, the SHMM 260 removes the existing history data in step 820 and proceeds to insert the new history data into data storage in step 822. If the history data does not already exist in step 818, the SHMM 260 proceeds directly to step 822 and inserts the history data into data storage. If the history data is the last history data record in step 824, the SHMM 260 terminates the process 800. If not, the SHMM 260 continues to insert history data into data storage, as indicated by step 822.

Returning to step 816, if the image data package does not include history data, the SHMM 260 proceeds to step 826. In step 826, the SHMM 260 determines if the image data package includes operational data. If the image data package does not include operational data, the process 800 is terminated. If the image data package does include operational data, the SHMM 260 determines if operational data exists for shadowed platform in data storage, as indicated by step 828. This can be determined, for example, by the data types from step 802 and the platform IDs from step 804. If the operational data already exists, the SHMM 260 removes the existing operational data in step 830 and proceeds to insert the new operational data into data storage in step 832. If the operational data does not already exist in step 828, the SHMM 260 proceeds directly to step 832 and inserts the operational data into data storage. If the operational data is the last operational data record in step 834, the SHMM 260 terminates the process 800. If not, the SHMM 260 continues to insert operational data into data storage, as indicated by step 834.

Figure 9:
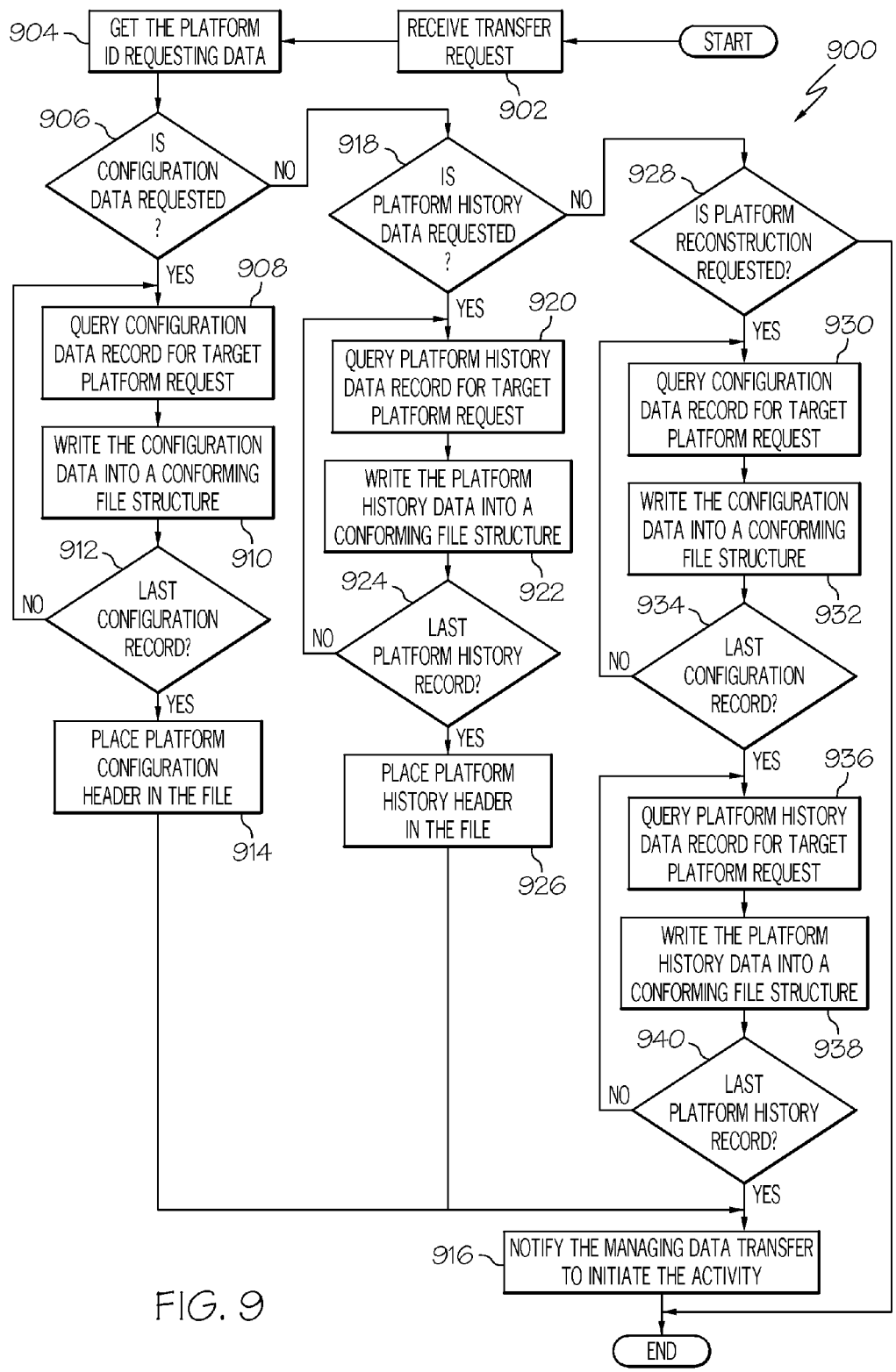
FIG. 9 is a flowchart depicting a process for health data management used in connection with the shadow health management module of FIG. 4, namely the process of packaging data in response to a request, in accordance with an exemplary embodiment.

FIG. 9 is a flowchart depicting a process 900 for health data management used in connection with the SHMM 260 of FIG. 2, namely the process of packaging data in response to a transfer request, in accordance with an exemplary embodiment. In general, the process 900 may correspond to packaging data for transfer in response to a transfer request from shadowed platforms (block 420 of FIG. 4). In one exemplary embodiment, a transfer request may be generated by the shadowed platform in need of constructing necessary infrastructure to support the operations of health management for a selected platform. This request may send from a shadowed platform to a shadowing platform based on an established shadowing relation.

In a first step 902, the SHMM 260 receives a data transfer request from a shadowed platform for either itself or a surrogate platform. In step 904, the SHMM 260 determines the ID of the platform requesting data and ID of the surrogate platform. If the data request is for the resident platform, then these two IDs are the same. In step 906, the SHMM 260 determines if configuration data is requested. If configuration data is not requested, the SHMM 260 proceeds to step 918, discussed below. If configuration data is requested, the SHMM 260 proceeds to step 908 in which the configuration data record for the requested platform is queried from storage. In step 910, the SHMM 260 writes the configuration data into a file with conforming structure. In step 912, the SHMM 260 determines if the configuration data record is the last record. If it is not, the SHMM 260 returns to step 908 to continue with the writing data process. If the configuration data record is the last configuration data record for the requesting platform, the process 900 inserts a platform configuration header to the file in step 914 and proceeds to step 916 to initiate the data transfer to the requesting platform.

Returning to step 906, if configuration data is not requested, the SHMM 260 determines if history data is being requested in step 918. If history data is not requested, the SHMM 260 proceeds to step 928, discussed below. If history data is requested, the SHMM 260 proceeds to step 920 in which the history data record for the requested platform is queried from storage. In step 922, the SHMM 260 writes the history data into a file with conforming structure. In step 924, the SHMM 260 determines if the history data record is the last record. If it is not, the SHMM 260 returns to step 920. If the history data record is the last history data record for the requesting platform, the process 900 places a platform history header to the file in step 926 and proceeds to step 916 to initiate the data transfer to the requesting platform.

Returning to step 906, if history data is not requested, the SHMM 260 determines if complete reconstruction is being requested in step 928. If reconstruction data is not requested, the SHMM 260 terminates the process 900. If reconstruction data is requested, the SHMM 260 proceeds to step 930 in which the configuration data record for the requested platform is queried from storage. In step 932, the SHMM 260 writes the configuration data into a conforming file structure. In step 934, the SHMM 260 determines if the configuration data record is the last record. If it is not, the SHMM 260 returns to step 930. If the configuration data record is the last configuration data record for the requesting platform, the process 900 continues to step 936 in which the reconstruction history data record for the requested platform is queried from storage. In step 938, the SHMM 260 writes the construction history data into a file with conforming structure. In step 940, the SHMM 260 determines if the construction history data record is the last record. If it is not, the SHMM 260 returns to step 936. If the construction history data record is the last construction history data record for the requesting platform, the process 900 places a reconstruction header to the file and proceeds to step 916 to initiate the data transfer to the requesting platform.

Figure 10:
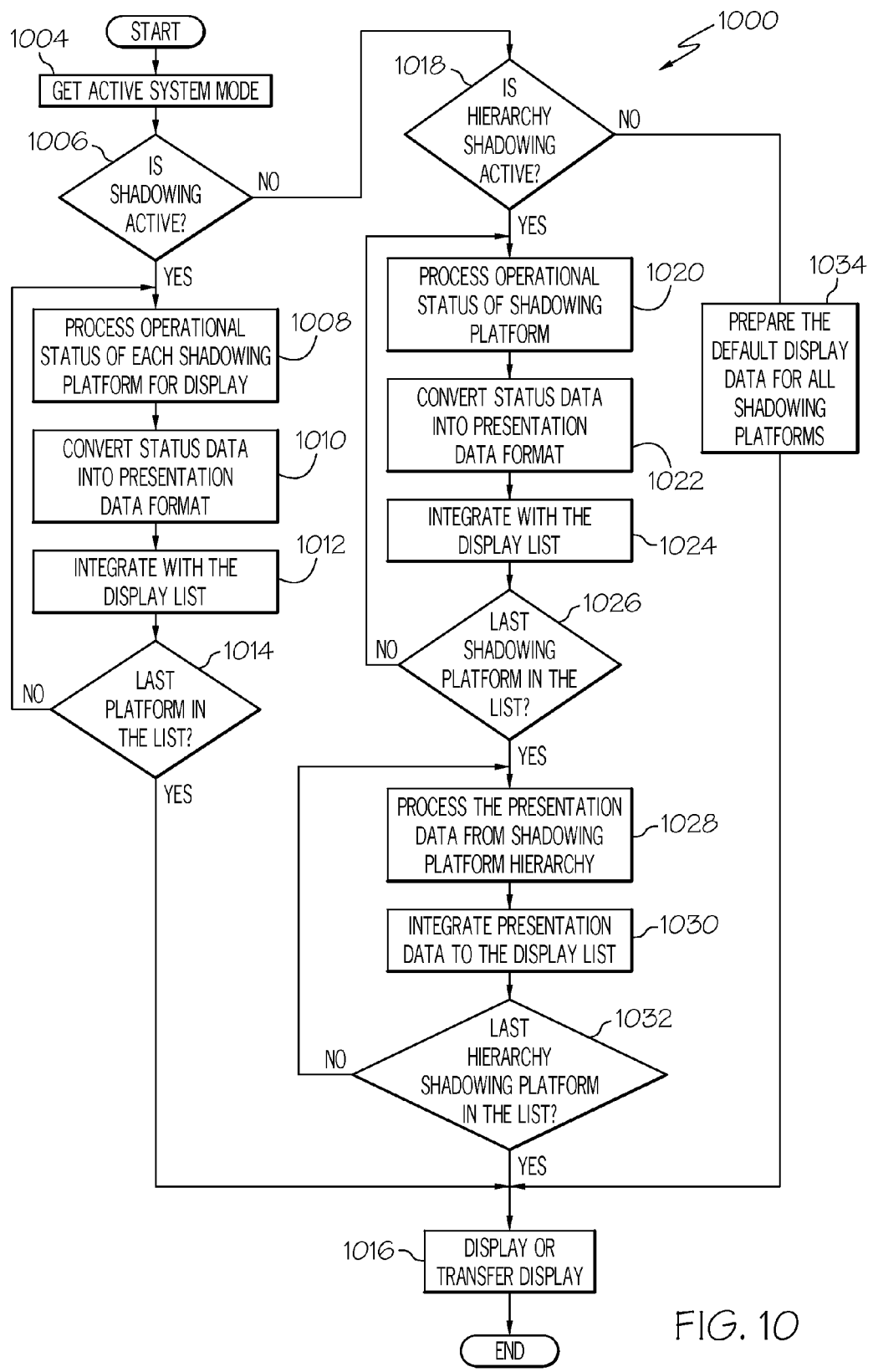
FIG. 10 is a flowchart depicting a process for health data management used in connection with the shadow health management module of FIG. 4, namely the process of constructing an overall operational status of the integrated health management system network.

FIG. 10 is a flowchart depicting a process 1000 for health data management used in connection with the SHMM 260 of FIG. 2, namely the process of processing an overall operational status of the integrated health management system network 100 (FIG. 1). In general, the process 1000 may correspond to processing an overall operational status of the integrated health management system network (block 424 of FIG. 4).

In a first step 1004, the SHMM 260 receives the status of the SHMM system mode, as indicated in FIG. 5. In step 1006, if the SHMM 260 is not in a shadowing mode, the SHMM 260 proceeds to step 1018, discussed below. If, in step 1006, the SHMM 260 is in a shadowing mode, the SHMM 260 proceeds to step 1008, and the SHMM 260 processes the operational status of each shadowing platform. In step 1010, the SHMM 260 converts the status data into presentation data format, and in step 1012, the SHMM 260 integrates the presentation data into a display list. In step 1014, the SHMM 260 determines if the display list is complete for the shadowing platforms. If not, the SHMM 260 returns to step 1008. If it is, the SHMM 260 then displays the display list or readies the display list for transfer in step 1016.

Returning to step 1006, if the SHMM 260 is not shadowing, the process 1000 proceeds to step 1018, and the SHMM 260 determines if hierarchy shadowing is active. In step 1018, if the SHMM 260 is not in a hierarchy shadowing mode, the SHMM 260 proceeds to step 1034 and the SHMM 260 prepares a default display list for all shadowing platforms. The SHMM 260 then proceeds to step 1016 and displays or transfers the display list. If, in step 1018, the SHMM 260 is in a hierarchy shadowing mode, the SHMM 260 proceeds to step 1020, and the SHMM 260 processes the operational status of each shadowing platform. In step 1022, the SHMM 260 converts the status data into presentation data format, and in step 1024, the SHMM 260 integrates the presentation data into a display list. In step 1026, the SHMM 260 determines if the display list is complete for the shadowing platforms. If not, the SHMM 260 returns to step 1020. If it is, the SHMM 260 proceeds to step 1028 and processes the presentation data from subsequent shadowing levels of the hierarchy shadowing platforms. In step 1030, the SHMM 260 integrates the presentation data into a display list. In step 1032, the SHMM 260 determines if the display list is complete for the shadowing platforms. If not, the SHMM 260 returns to step 1028. If it is, the SHMM 260 displays the display list or readies the display list for transfer in step 1016. Accordingly, the SHMM 260 functions to manage the necessary data flows to monitor the health of remote platforms, and if necessary, restore the health data of the remote platforms.

It will be appreciated that the steps in the various processes depicted in the Figures and/or described above may vary, may be executed simultaneously, and/or may be executed in a different order than depicted in the Figures and/or described above. It will similarly be appreciated that various apparatus, devices, systems, interactions, relationships, management, and/or other features, and/or parts and/or components thereof, may vary from those depicted in the Figures and/or described above. It will also be appreciated that the methods and systems may be implemented in connection with any number of different types of land vehicles, aircraft, spacecraft, marine vehicles, other types of vehicles, computers, controllers, control centers, operators, devices, systems, modules, and/or any number of other different types of platforms.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A shadowing platform in a network with a plurality of remote platforms, including a first remote platform shadowed by a second remote platform, the shadowing platform comprising:
    a shadow health management module;
    a gateway data proxy (GDP) coupled to the shadow health management module and configured to communicatively link the shadow health management module and the remote platforms; and
    platform storage coupled to the shadow health management module,
    the shadow health management module configured to, via the GDP,
        receive health information from the second remote platform;
        store the health information in the platform storage as input health data;
        filter, condition, and transform the input health data to generate conditioned health data;
        store the conditioned health data in the platform storage;
        receive status information from the second remote platform; and
        provide the conditioned health data to the second remote platform when the status information is unacceptable, and
    wherein the shadow health management module is further configured to, via the GPD, based on the status information of the second remote platform,
        establish a remote connection with the first remote platform, receive health information from the first remote platform, store the health information in the platform storage; receive status information from the first remote platform; and provide the health information to the first remote platform when the status information from the first remote platform is unacceptable.

2. The shadowing platform of claim 1, wherein health information is critical health information for operation of the second remote platform.

3. The shadowing platform of claim 1, wherein the shadow health management module is configured to restore the second remote platform to an acceptable operational status.

4. The shadowing platform of claim 1, wherein the shadow health management module is configured to establish a shadowing relationship with the second remote platform.

5. The shadowing platform of claim 1, wherein the shadow health management module is configured to establish a remote network connection with the second remote platform.

6. The shadowing platform of claim 1, wherein the shadow health management module is configured to manage data transfer with the second remote platform by establishing a platform configuration and fault relationship data constructs.

7. The shadowing platform of claim 6, wherein the shadow health management module is configured to manage conditions to initiate the data transfer with the second remote platform based on a shadowing responsibility list with operational and deployment policies and user selections.

8. The shadowing platform of claim 1, wherein the shadow health management module is configured to merge the health information with partial health information associated with the second remote platform.

9. The shadowing platform of claim 1, wherein the shadow health management module is further configured to aggregate the health information from the first remote platform and the health information from the second remote platform.

10. A method of health monitoring in a network of platforms, the method comprising the steps of:
    receiving, at a resident platform, health information from a first remote platform via a gateway data proxy (GDP);
    storing, in the resident platform, the health information from the first remote platform via the gateway data proxy (GDP);
    receiving, at the resident platform, status information from the first remote platform via the gateway data proxy (GDP);
    providing, from the resident platform, the health information of the first remote platform to the first remote platform via the gateway data proxy (GDP) when the status information is unacceptable;
    receiving a data request, from a user, at the resident platform for the health information of the first remote platform, the data request including operational and usage data, mode status information, maintenance orders and records, equipment and platform readiness, and diagnostics and prognostics results associated with the first remote platform; and
    presenting the requested data to the user,
    wherein the method further comprises
    establishing, based on the status information of the first remote platform, a remote connection with the second remote platform;
    receiving health information from the second remote platform;
    storing the health information from the second remote platform in the platform storage;

receiving status information from the second remote platform; and providing the health information of the second remote platform to the second remote platform when the status information from the second remote platform is unacceptable.

11. The method of claim 10, wherein the providing step includes providing critical health information to the first remote platform.

12. The method of claim 10, further comprising the steps of assigning shadowing responsibility of the resident platform with respect to the remote platform; and managing conditions to initiate a data transfer between the resident platform and the first remote platform.

13. The method of claim 10, further comprising the step of merging, in the resident platform, the health information associated with the first remote platform with partial health information associated with the first remote platform.

14. The method of claim 10, further comprising the steps of establishing a remote network connection between the resident platform and the first remote platform; and managing data transfer between the resident platform and the first remote platform.

15. A network of platforms, comprising:

a first platform;

a second platform configured to communicate with the first platform and comprising a first shadow health management module, first platform storage coupled to the first shadow health management module, and a first gateway data proxy (GDP) coupled to the first shadow health management module, the first shadow health management module configured to, via the first GDP, receive health information from the first platform, store the health information in the first platform storage; receive status information from the first platform; and provide the health information to the first platform when the status information is unacceptable; and a third platform configured to communicate with the first and second platforms and comprising a second shadow health management module, second platform storage coupled to the second shadow health management module, and a second gateway data proxy (GDP) coupled to the second shadow health management module, the second shadow health management module configured to, via the second GDP, receive health information from the second platform, store the health information in the second platform storage; receive status information from the second platform; and provide the health information to the second platform when the status information is unacceptable, and wherein the second shadow health management module is configured to, based on the status information of the second platform, establish a remote connection with the first platform, receive health information from the first platform, store the health information in the second platform storage; receive status information from the first platform; and provide the health information to the first platform when the status information is unacceptable.

16. The shadowing platform of claim 1, wherein the health information includes historical data, operational data, and configuration data associated with the second remote platform.

17. The method of claim 10, further comprising the steps of receiving a shadowing assignment list, including a shadowing assignment for the second remote platform;

determining the shadowing status of the second remote platform; and initiating the shadowing assignment for the second remote platform or a hierarchy shadowing assignment for the second remote platform based on the shadowing status of the second remote platform.

18. The shadowing platform of claim 1, wherein the shadow health management module includes a presentation processing unit configured to receive display requests for the conditioned health data and to generate presentation data based on the display request and the conditioned health data.

19. The shadowing platform of claim 18, wherein the presentation data includes diagnostic and prognostic results, maintenance records and recommendation, and operational data for the second remote platform.

* * * * *